United States Patent [19]

Hashimoto et al.

[11] Patent Number: 5,623,135

[45] Date of Patent: Apr. 22, 1997

[54] POWER SOURCE SWITCHING DEVICE WITH PLURAL INTERLOCKING ELEMENTS

[75] Inventors: Hidenobu Hashimoto; Tohru Katoh, both of Aichi-ken, Japan

[73] Assignee: Kabushiki Kaisha Aichi Denki Seisakusho, Nagoya, Japan

[21] Appl. No.: 526,234

[22] Filed: Sep. 11, 1995

[51] Int. Cl.⁶ ............................ H01H 9/20; H01H 33/00; H02B 11/133

[52] U.S. Cl. .................. 200/50.21; 307/80; 361/607; 200/50.32

[58] Field of Search .................. 200/50.21–50.27, 200/50.101–50.2, 50.28–50.4; 361/605–617; 307/64, 80

[56] References Cited

U.S. PATENT DOCUMENTS 4,233,643  11/1980  Iverson et al. .................. 361/616
4,937,403   6/1990  Minoura et al. ................. 200/50.21

FOREIGN PATENT DOCUMENTS 2-44619   2/1990  Japan ........................... H01H 33/00

*Primary Examiner*—J. R. Scott
*Attorney, Agent, or Firm*—Jacobson, Price, Holman & Stern PLLC

[57] ABSTRACT

A switch unit is movably arranged in a housing for selective connection of two power sources to a load circuit. When the switch unit is extracted out of the housing, one power source is connected to the load circuit via one by-pass switch unit arranged on the switch unit, thereby avoiding interruption of power supply. When such power supply from the one power source is interrupted, connection is automatically shifted to the other power source via the other by-pass switch unit arranged on the switch unit. When one by-pass switch unit is closed to connect one power source to the load circuit, one interlocking element movable with that by-pass switch unit stops one engaging element movable with one contact, thereby inhibiting concurrent connection of two power sources to the load circuit.

6 Claims, 15 Drawing Sheets

5,623,135

POWER SOURCE SWITCHING DEVICE WITH PLURAL INTERLOCKING ELEMENTS

BACKGROUND OF THE INVENTION

The present invention relates to an improved power source switching device, and more particularly relates to improvements in the supply of power provided by a switching device adapted for selectively connecting a load circuit to different power sources such as ordinary and emergency power sources.

One typical example of such a power source switching unit is proposed in Japanese Patent 2-44619 which corresponds to U.S. Pat. No. 4,934,403 and which discloses an extractable type switching device. More specifically, its first contact piece is connected to the first power source, its second contact piece is connected to the second power source and its third contact piece is connected to a load circuit, respectively. When the switch device is registered at its operative position, the device is automatically connected to the power sources as well as the load circuit. As the switch device is extracted out of the operative position, connections are automatically cancelled. The switch device is internally provided with the first contact adapted for separable connection between the first and third contact pieces, and the second contact adapted for separable connection between the second and third contact pieces. A by-pass switch unit is interposed between the first and third contact pieces in order to provide electric and mechanical interlock between the first and second contacts as well as between these contacts and the by-pass switch unit. Use of such a by-pass switch unit effectively prevents concurrent closure of the two contacts and also prevents contact damage due to arc discharge.

In operation of the power source switching device of the above-described proposal, the first or second contact is selectively connected to the third contact piece via manual or magnetic operation in order to shift the power source to be connected to the load circuit. When the switch device is extracted from its housing for maintenance or testing purposes, the first power source is connected to the load circuit in order to avoid undesirable interruption of power supply.

With this conventional system, however, no power can be supplied to the load circuit when the first power source is not in operation.

SUMMARY OF THE INVENTION

It is the object of the present invention to provide a power source switching device which allows free maintenance and testing without the danger of power supply interruption under any conditions.

In accordance with the basic aspect of the present invention, a housing of the device is internally provided with the first contact piece connected to the first power source, the second contact piece connected to the second power source, and the third contact piece connected to a load circuit. A switch unit is movably arranged in the housing and provided with the first and second input pieces which are connectable to the first and second contact pieces respectively, and an output piece which is connectable to the third contact piece for the load circuit. The switch unit is further provided with the first contact which separably connects the first input piece to the output piece, and the second contact which separably connects the second input piece to the output piece. When the switch unit is registered at an operative position in the housing, the first input piece, second input piece and output piece are brought into contact with the first to third contact pieces, respectively. Whereas, when the switch unit is registered at an inoperative position out of the housing, the first input piece, second input piece and output piece are brought out of contact with the first to third contact pieces, respectively. The first by-pass switch unit is interposed between the first and third contact pieces for direct and separable connection between these contact pieces, whereas the second by-pass switch unit is interposed between the second and third contact pieces for direct and separable connection between these contact pieces. The first interlocking element is operationally related to the first and second by-pass switch units. The first engaging element is operationally related to the first contact and located on a course of movement of the first interlocking element when the first contact is closed in order to inhibit closure of the second by-pass unit. The second interlocking element is operationally related to the first and second by-pass switch units. The second engaging element is operationally related to the second contact and located on a course of movement of the second interlocking element when the second contact is closed in order to inhibit closure of the first by-pass switch unit. The third interlocking element is located on the course of movement of the second engaging element when the first by-pass switch unit is closed in order to inhibit closure of the second contact, whereas the fourth interlocking element is located on a course of movement of the first engaging element when the second by-pass switch unit is closed in order to inhibit closure of the first contact.

When the switch device is extracted out of its housing for maintenance or testing purposes, one of the first and second power sources is connected to the load circuit via the by-pass switch units so that power supply to the load circuit is continued without interruption. When the power source selected ceases its power supply accidentally under this condition, the by-pass switch units are shifted to establish an alternative connection to the other of the two power sources.

The following interlocking operates in relation to closure of the by-pass switch units, closure of the first and second contacts of the switching device, and extraction of the switching device from its housing.

Under a condition that one of the by-pass switch units is closed and one of the first and second power sources is connected to the load circuit via the closed by-pass switch unit, one of the first and second interlocking elements hinders movement of one of the engaging elements to inhibit closure of the first and second contacts thereby preventing surplus power from being supplied to the load circuit which would otherwise be caused by concurrent connection to both of the two power sources.

Similarly under a condition that the first contact is closed and the first power source is connected to the load circuit via the closed contact, the first engaging element hinders movement of the first interlocking element to inhibit closure of the second by-pass switch unit. Further under a condition that the second contact is closed and the second power source is connected to the load circuit via the closed contact, the second engaging element hinders movement of the second interlocking element to inhibit closure of the first by-pass switch unit. As a consequence, the system again prevents surplus power from being supplied to the load circuit which would otherwise be caused by concurrent connection to both of the two power sources.

DESCRIPTION OF THE PREFERRED EMBODIMENTS

In the following descriptions, the switching device in accordance with the present invention will be explained in connection with a three-phase four-wire power supply system not to mention that the present invention can well be applicable to power supply systems of other types too.

Figure 1:
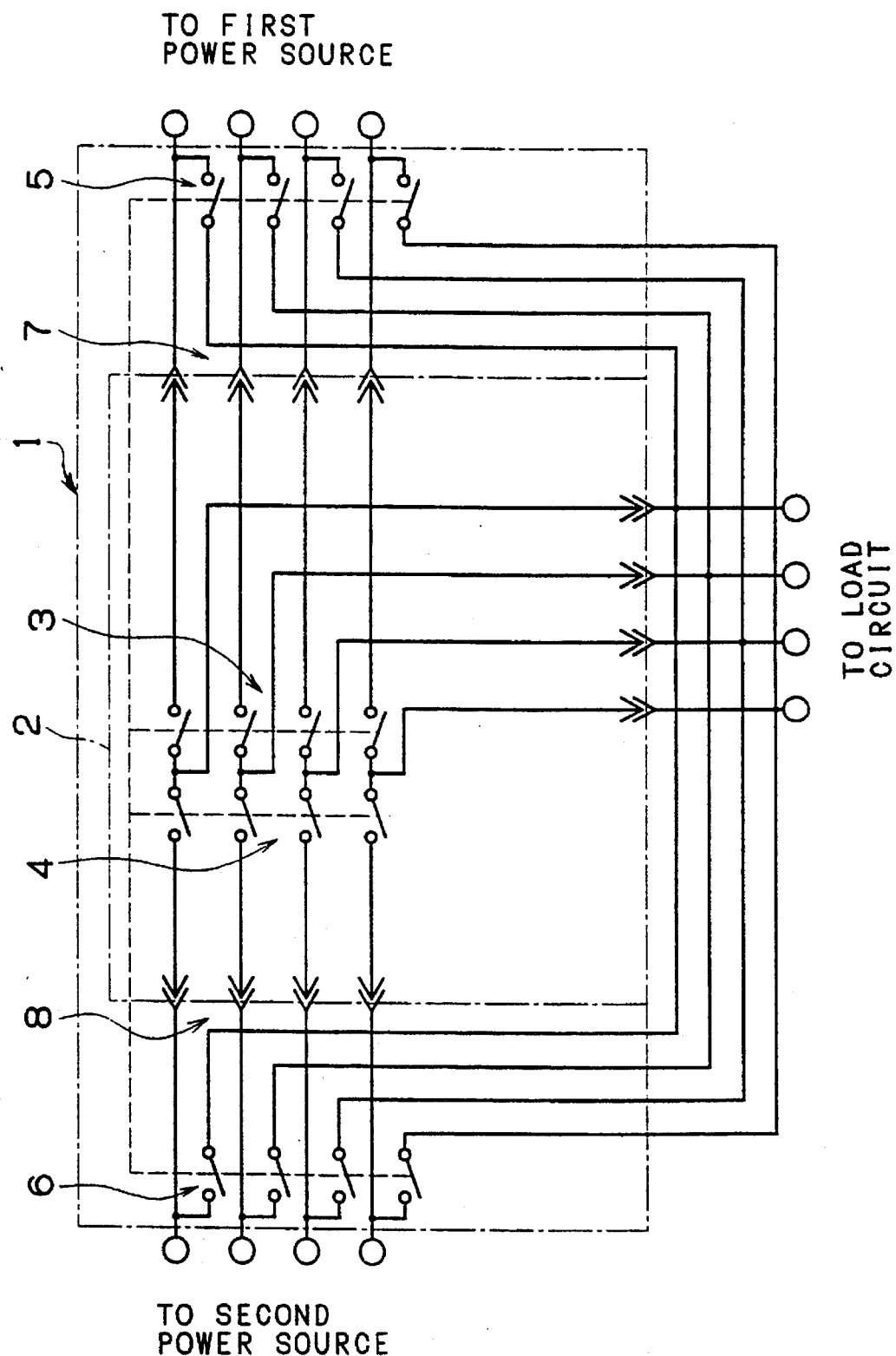
FIG. 1 is a circuit diagram of the power source switching device in accordance with the present invention.

In FIG. 1, a power source switching device 1 in accordance with the present invention is provided with a switch unit 2 which includes a set of three-phase contacts 3 adapted for connecting the first power source such as an ordinary power source to a load circuit and a set of three-phase contacts 4 adapted for connecting the second power source such as an emergency power source to the load circuit. The switching device 1 further includes the first and second three-phase by-pass switch units 5 and 6 for direct connection of the first or second power source to the load circuit without the switch unit 2. The switch unit 2 is connected via main circuit breakers 7 and 8 to the first and second power sources, respectively. The first and second contacts 3, 4 and the by-pass switch units 5, 6 in the switch unit 2 are operated either manually or magnetically.

Figure 2:
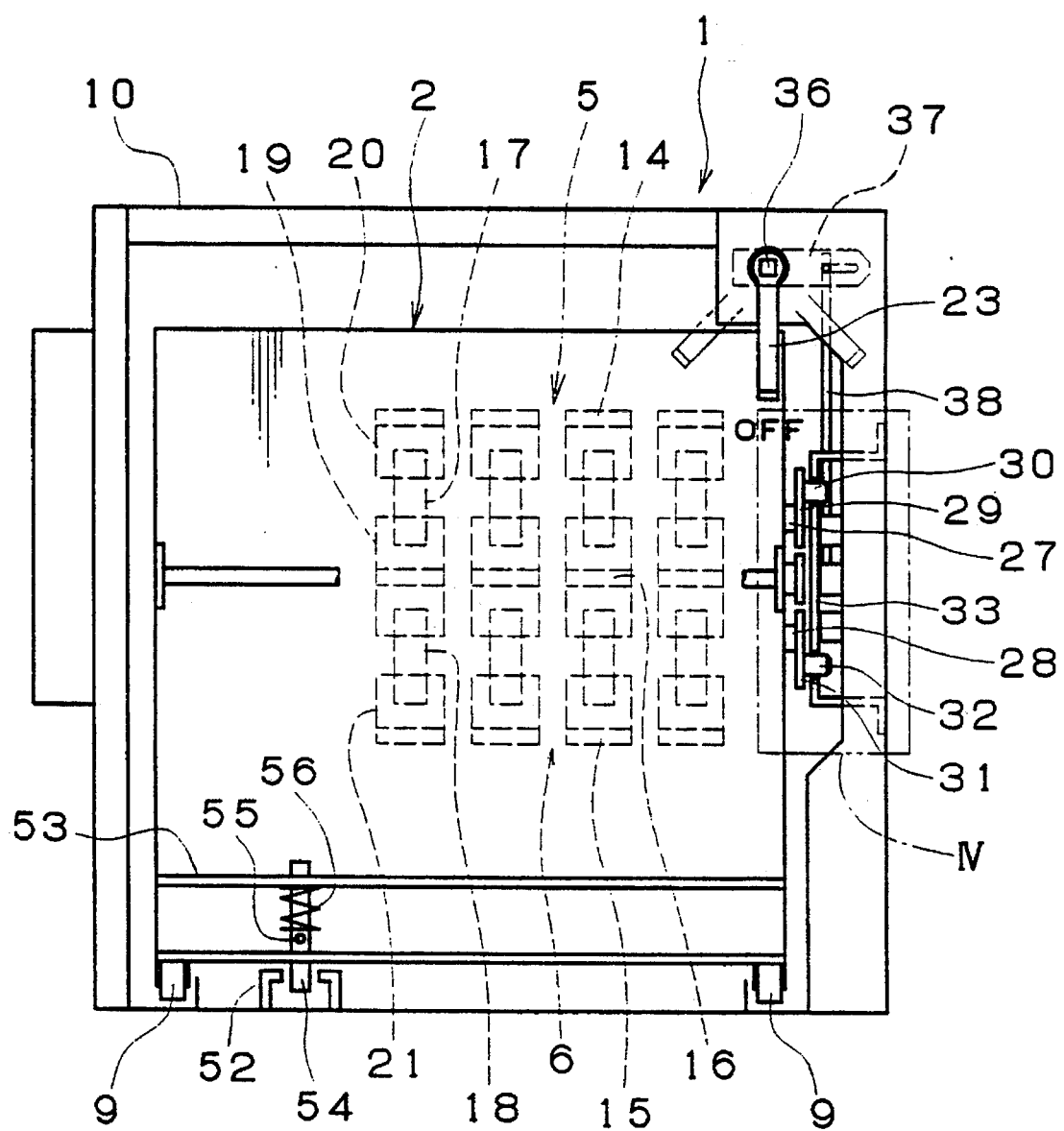
FIG. 2 is a front view of the power source switching device.
Figure 3:
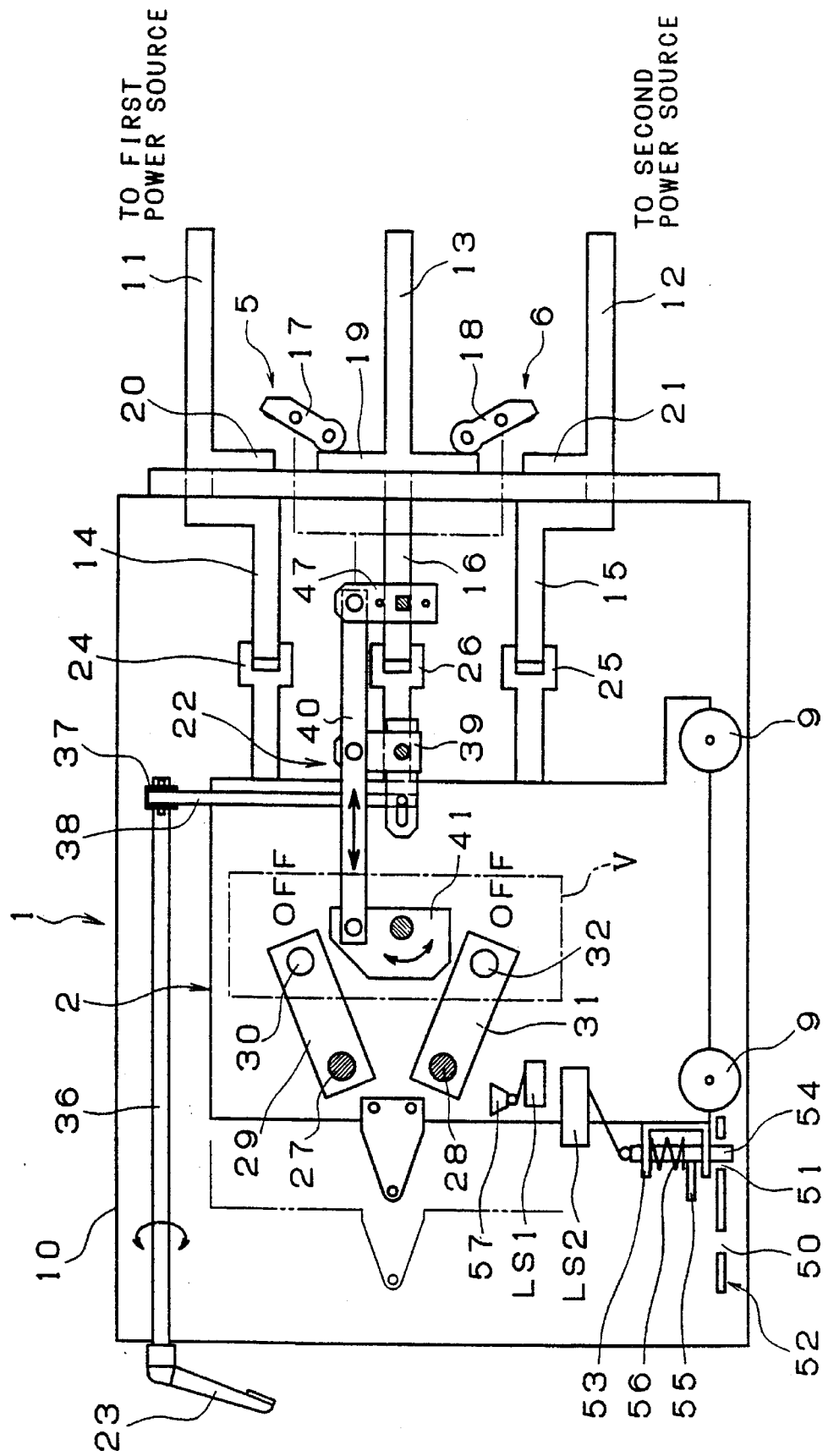
FIG. 3 is a side view of the power source switching device.
Figure 4:
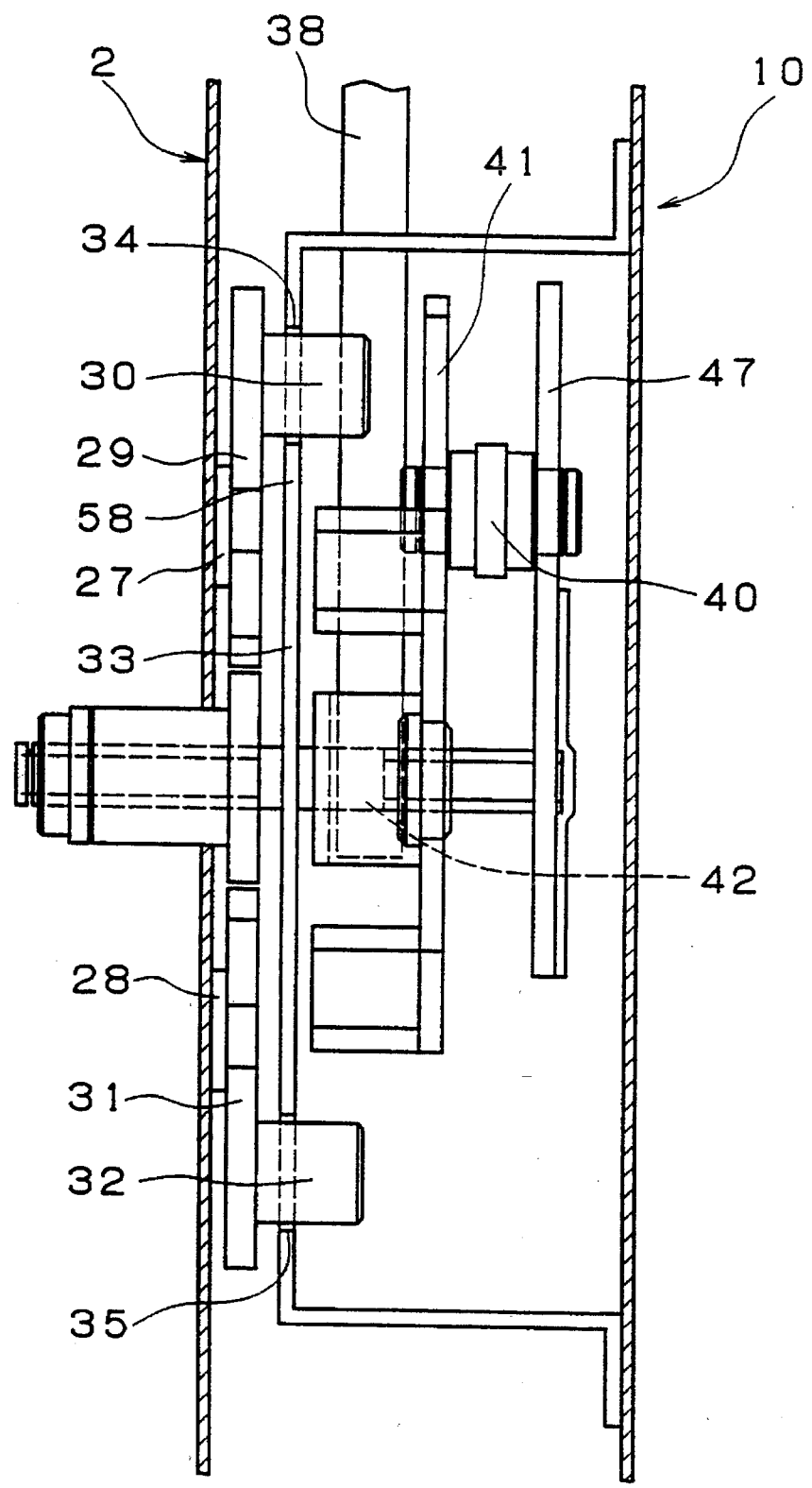
FIG. 4 is a front view of the section IV in FIG. 2.

The construction of the power source switching device 1 is shown further in detail in FIGS. 2 through 4. As shown in FIGS. 2 and 3, the switch unit 2 is provided with casters 9 at its bottom section and encased within a housing 10 in an arrangement which is movable back and forth.

On the rear side, the housing 10 is externally provided with the first terminal 11 connected to the first power source such as an ordinary power source, the second terminal 12 connected to the second power source such as an emergency power source, and the third terminal 13 connected to a load circuit. Inside the housing 10, the first terminal 11 is connected to the first contact piece 14, the second terminal 12 is connected to the second contact piece 15, and the third terminal 13 is connected to the third contact piece 16. The first and second by-pass switch units 5, 6 are mounted to the rear side of the housing 10.

Figure 7:
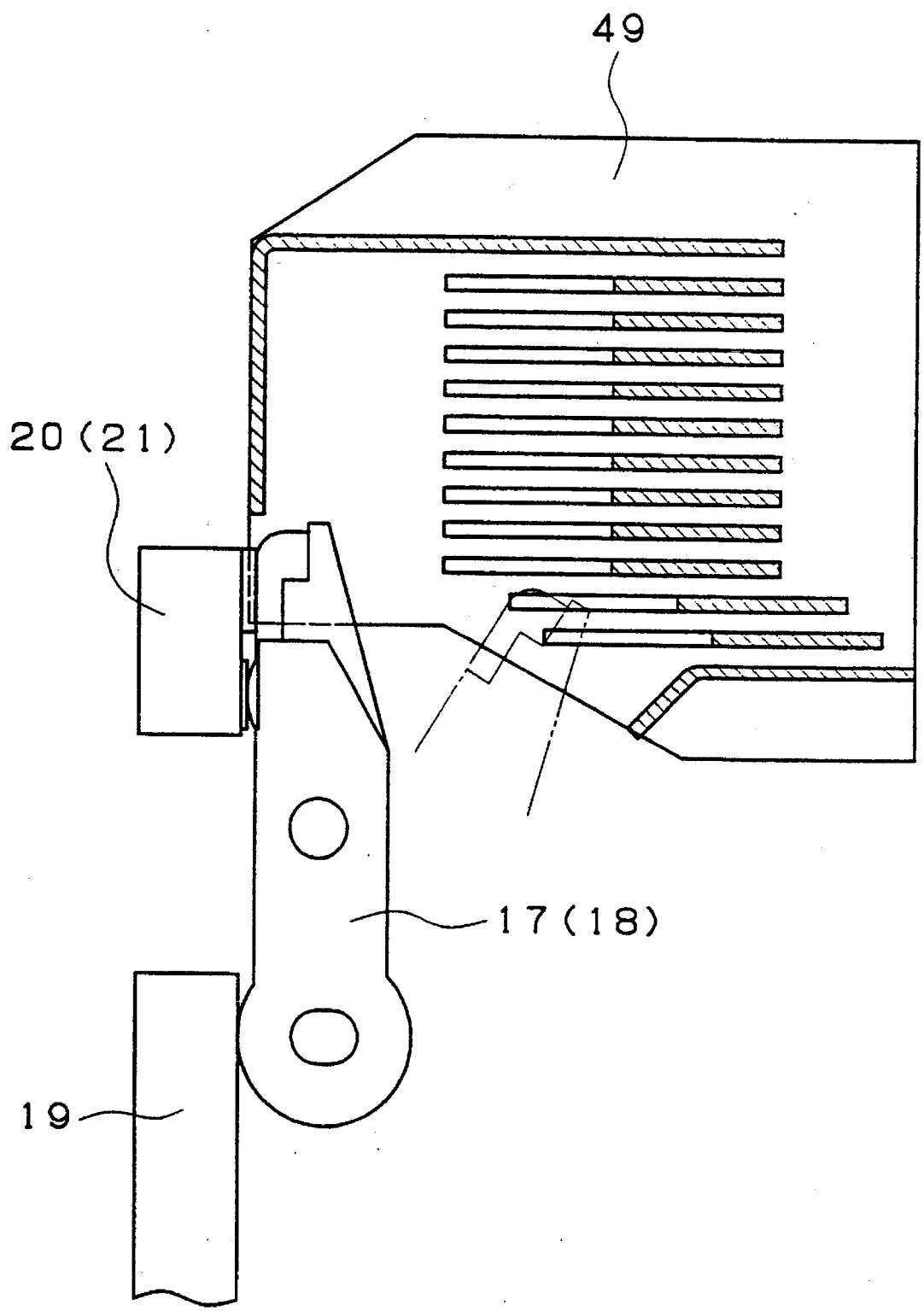
FIG. 7 is a side view of the contact pieces of the by-pass switch unit.

The by-pass switch unit 5 includes a contact piece 17 adapted for separable connection between the first terminal 11 and the third terminal 13, whereas the by-pass switch unit 6 includes a contact piece 18 adapted for separable connection between the second terminal 12 and the third terminal 13. The contact piece 17 is pivoted to the housing 10 with its one end being in constant contact with a conductor 19 connected to the third terminal 13 and the other end being adapted for contact with a conductor 20 connected to the first terminal 11. The contact piece 18 is also pivoted to the housing 10 with its one end being in constant contact with the conductor 19 and the other end being adapted for contact with a conductor 21 connected to the second terminal 12. The contact pieces 17 and 18 are connected, via a transmission mechanism (not shown) and a drive mechanism 22, to an operation handle 23 mounted to the front side of the housing 10. When the operation handle 23 is turned, the contact pieces 17 and 18 are brought into selective contact with the first terminal 11 or the second terminal 12 for power supply through the third terminal 13. As shown in FIG. 7, the distal ends of the contact pieces 17 and 18 are accommodated in an arc-suppression chamber 49 in order to suppress arc-generation during opening of the connections.

The switch unit 2 is also provided in its rear section with a pair of input pieces 24, 25 and an output piece 26. When the switch unit 2 is registered at the operative position within the housing 10, the pieces 24 to 26 are brought into contact with the first to third contact pieces 14 to 16, respectively. The switch unit 2 is further internally provided with the first contacts 3 adapted for separable connection between the first input piece 24 and the output piece 26 as well as the second contacts 4 adapted for separable connection between the second input piece 25 and the output piece 26.

The first and second shaft 27, 28 project from one side wall of the switch unit 2. The first shaft 27 rotates in response to operation of the first contacts 3, whereas the second shaft 28 rotates in response to operation of the second contacts 4. A lever 29 is fixed at its proximal end to the first shaft 27 and provided at its distal end with an engaging element 30. A lever 31 is fixed at its proximal end to the second shaft 28 and provided at its distal end with an engaging element 32. The switch unit 2 is interlocked so that a neutral position should exist at shifting of the contacts. More specifically, closure of one of the two contacts 3 and 4 is allowed only after opening of the other of the two contacts 4 and 3.

Figure 5:
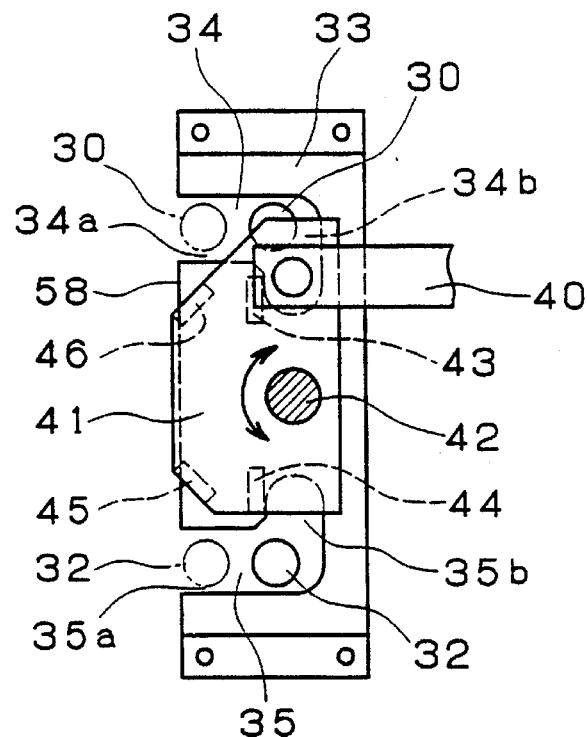
FIG. 5 is a side view of the section V in FIG. 3.

As shown in FIG. 4, a guide plate 33 is secured to the inner face of one side wall of the housing 10 and, as shown in FIG. 5, provided with a pair of upper and lower L-shaped grooves 34 and 35. The grooves 34, 35 are made up of horizontal sections 34a, 35a and vertical sections 34b, 35b, respectively. The L-shaped grooves 34 and 35 accommodate the engaging elements 30 and 32 when the switch unit 2 is registered at its operative position in the housing 10. The engaging elements 30 and 32 pass through the horizontal sections 34a, 35a when the switch unit 2 is pushed towards the operative position in the housing 10, turn in the vertical sections 34b, 35b when the contacts 3 and 4 are closed, and rest in the vertical sections 34b, 35b at closure of the contacts 3 and 4 to inhibit extraction of the switch unit 2 from the housing 10.

As stated above, the operation handle 23 is connected to the by-pass switch units 5 and 6 via the transmission mechanism not shown and the drive mechanism 22 (see FIGS. 2 and 3). The drive mechanism 22 includes a shaft 36, an arm 37, a rod 38, a lever 39, a link 40 and an operation lever 47. The operation handle 23 is supported by the housing 10 by assistance of the shaft 36 extending horizontally through the front wall of the housing 10. The arm 37 is fixed to the rear end of the shaft 36 and the rod 38 extends radially from the rear end of the shaft 36. The shaft 36 transmits turning of the operation handle 23 to the arm 37. That is, the rear end of the shaft 36 is coupled to an interlock plate 41 via the arm 37, the rod 38, the lever 39 and the link 40. The lever 39 is pivoted to the housing 10 via a pin 59.

The interlock plate 41 is pivoted at its upper end to the front end of the link 40 and at its middle section to one side wall of the housing 10 via a pin 42. As the shaft 36 rotates, the link 40 swings back to forth and the interlock plate 41 turns about the pin 42. As shown in FIG. 5, the position of the interlock plate 41 overlaps that of the guide plate 33 and the interlock plate 41 is provided with four interlocking elements 43 to 46 projecting towards the guide plate 33.

The third and fourth interlocking elements 45 and 46 close a respective one of the vertical sections 34b and 35b in the guide plate 33 when the interlock plate 41 is inclined in one direction, i.e. at closure of one of the by-pass switch units 5 and 6 in order to inhibit invasion of the engaging elements 30 and 32, thereby inhibiting closure of the contacts 3 and 4. The first and second interlocking elements 43 and 44 contact the engaging elements 30 or 32 in the vertical sections 34b, 35b in the guide plate 33 when one of the engaging elements 30 and 32 invade into the vertical sections 34b, 35b, i.e. at closure of one of the contacts 3, 4 of the switch unit 2, thereby inhibiting turning of the interlock plate 41 in one direction. When turning of the interlock plate 41 in one direction is inhibited, closure of the by-pass switch unit 5, 6 with the contacts 3, 4 being open is inhibited.

The rear end of the link 40 is pivoted to the upper end of an operation lever 47 which is fixed at its lower end to a shaft 48. The shaft 48 is in turn coupled to the contact pieces 17 and 18 via an additional transmission mechanism not shown. As the shaft 48 rotates counterclockwise in FIG. 6, the contact piece 17 for the first power source is closed. Whereas, as the shaft 48 rotates clockwise, the contact piece 18 for the second power source is closed. The above-described transmission mechanism for the by-pass switch units 5 and 6 includes the shaft 36, the arm 37, the rod 38, the lever 39, the link 40, the operation lever 47 and the shaft 48 shown in the drawings.

As shown in FIG. 3, the housing 10 is provided at its bottom a horizontal lock plate 52 having through holes 50 and 51. Corresponding to this arrangement, the switch unit 2 is provided in its lower section with a lock pin 54 which is vertically movable through its support bracket 53. The lock pin 54 is provided near its lower end with an operation handle 55 projecting forwards. The lock pin 54 is constantly urged to move downwards by an associated spring 56. At a descent position, the lower end of the lock pin 54 intrudes into the through holes 50, 51 in the lock plate 2 to inhibit movement of the switch unit 2.

Figure 6:
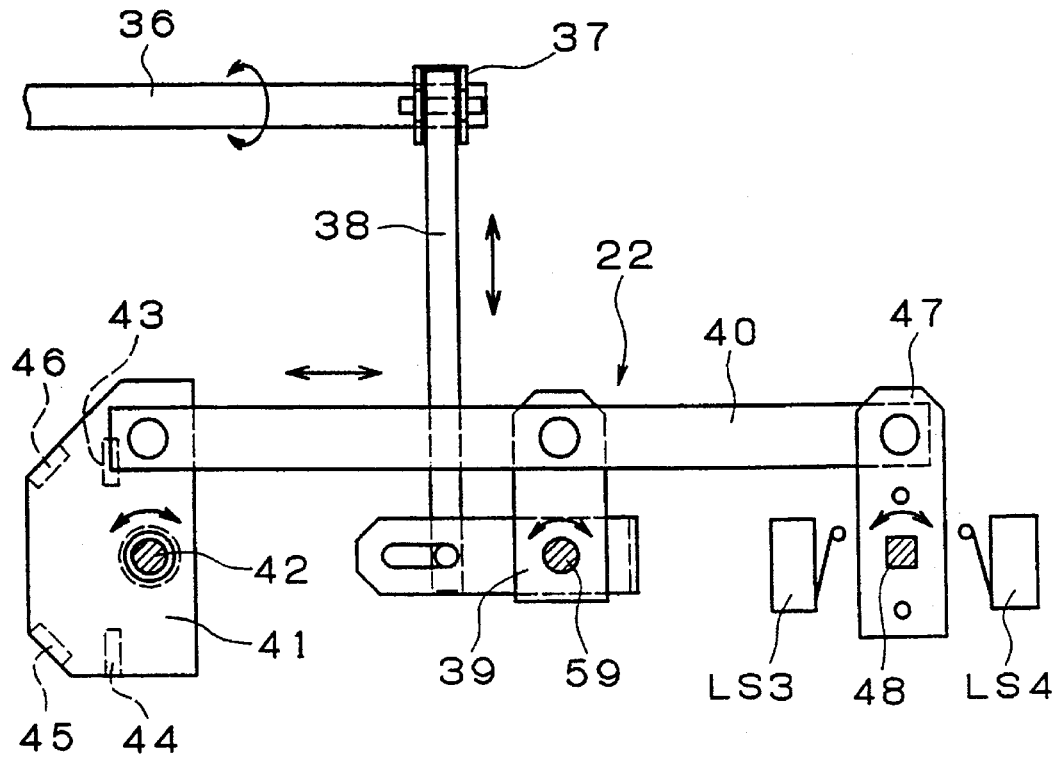
FIG. 6 is a side view of the handle link mechanism used for the switching device shown in FIG. 1.

A limit switch LS1 is mounted to one side wall of the housing 10. This limit switch opens its contacts while being pressed by a presser projection 57 mounted to the side face of the switch unit 2 when the latter is registered at the operative position. Whereas the contacts are closed when the switch unit 2 is registered at the inoperative position. A limit switch LS2 is arranged above the lock pin 54 and opens its contacts while being pressed by the lock pin 54 when the latter is lifted out of engagement with the through holes 50, 51 in the lock plate 52. A further limit switch LS3 shown in FIG. 6 is arranged to open its contacts when the contact piece 17 is closed by inclination of the operation lever 47. A limit switch LS4 is arranged to open its contacts when the contact piece 18 is closed by opposite inclination of the operation lever 47.

Figure 8:
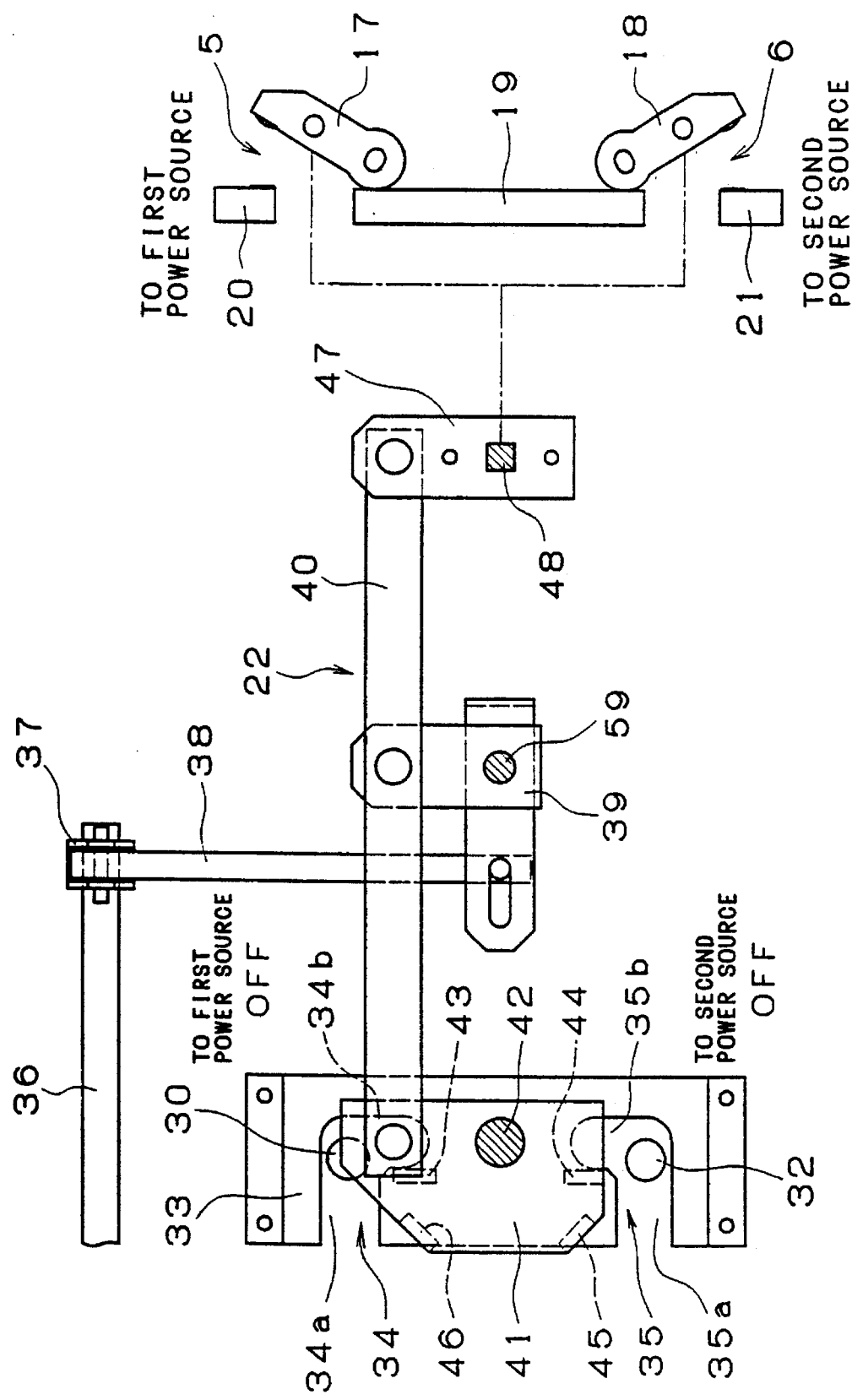
FIGS. 8–15 are simplified side views of the switching device in respective operation phase.

The operation of the above-described power source switching device 1 will now be explained in detail in reference to FIGS. 3, 6 and 8. Under the illustrated condition, the switch unit 2 is registered at the operative position in the housing 10 and the first and second contacts 3, 4 and the contact pieces 17, 18 of the by-pass switch units 5, 6 are all left open. In order to avoid interruption of power supplied to the load circuit under this condition, either of the contacts 3, 4 or the contact pieces 17, 18 are usually closed for continued power supply. As shown in FIGS. 5 and 8, nothing hinders movements of the engaging element 30 operationally related to the first contact and the engaging element 32 operationally related to the second contact 4. As a consequence, these elements 30 and 32 are allowed to invade into the vertical sections 34b, 35b of the grooves in the guide plate 33. That is, either of the contacts 3 and 4 can be closed. Thus, when the by-pass switch units 5 and 6 are registered at the neutral positions, the switch unit 2 can be connected to either of the first and second power sources selectively.

Figure 9:
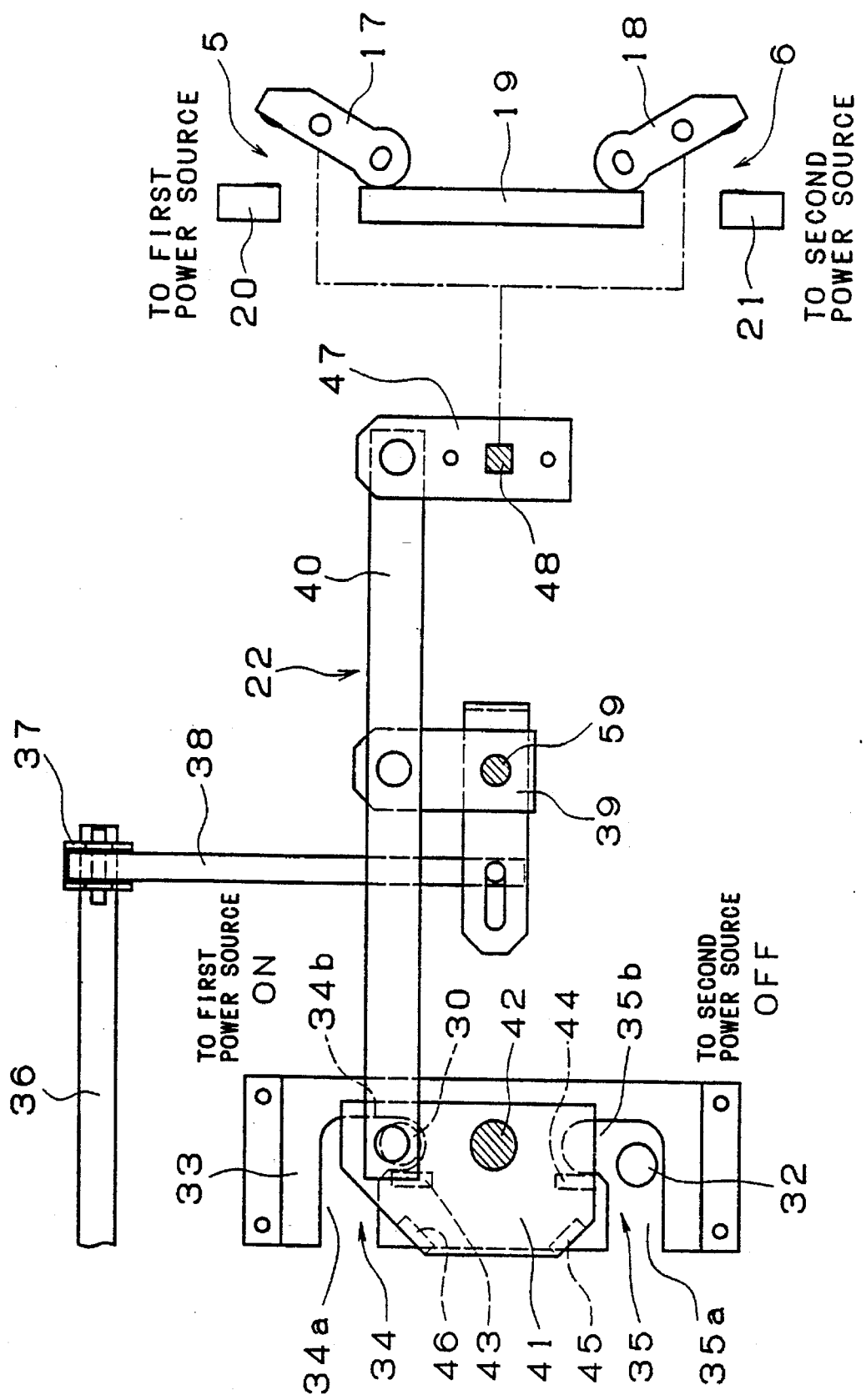
Figure 10:
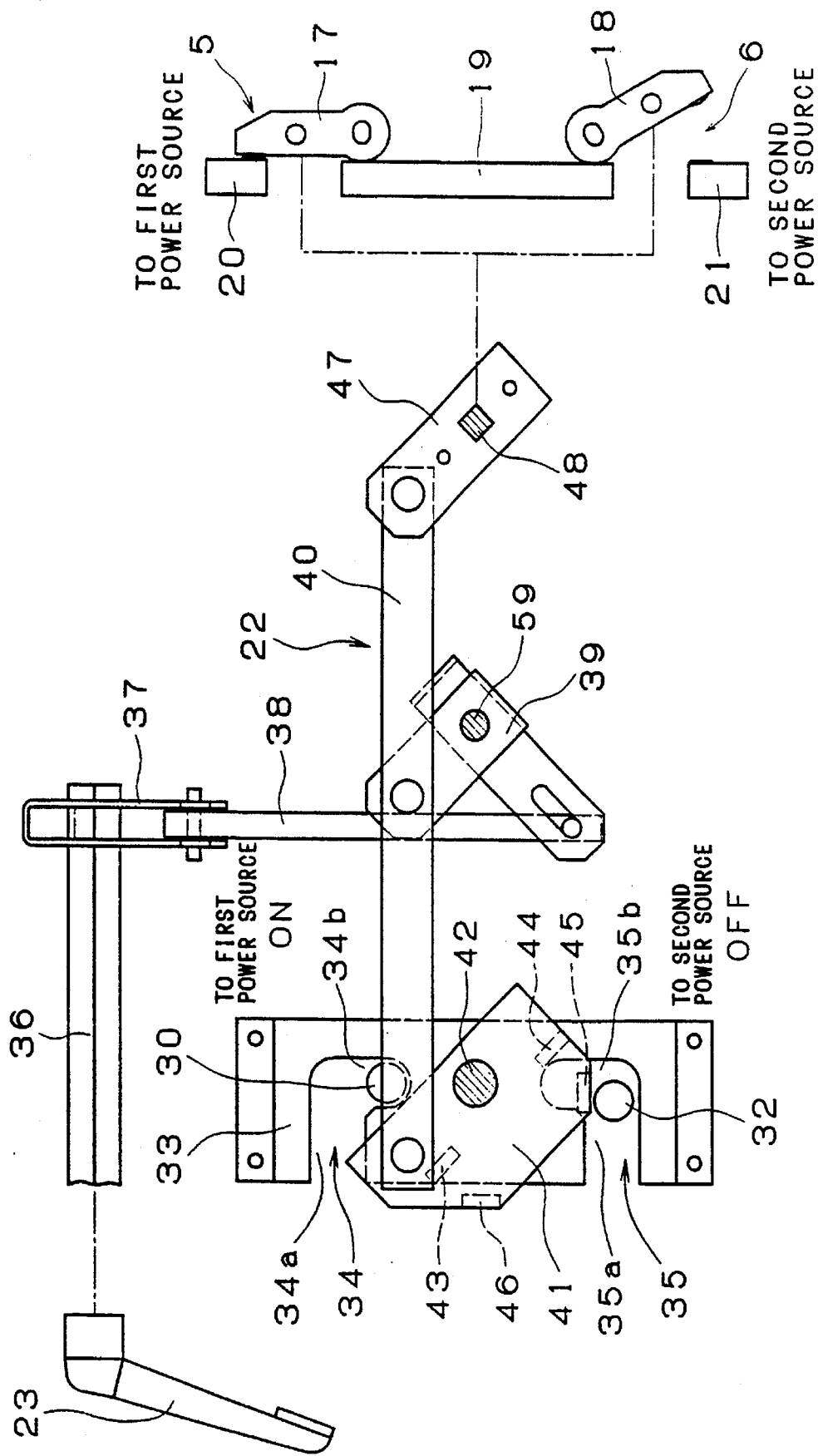
Figure 11:
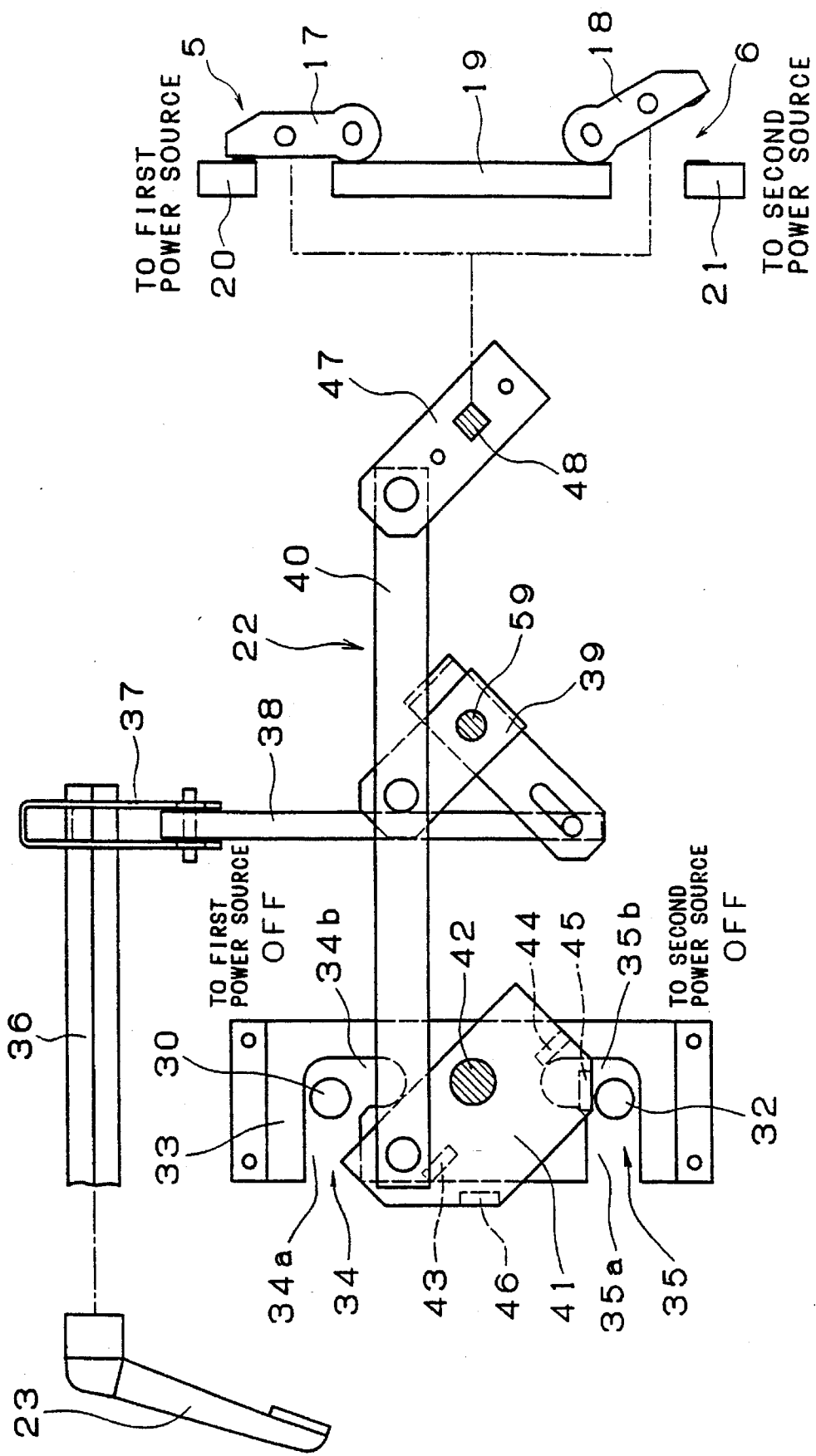

Under the condition shown in FIG. 9, the switch unit 2 is registered at the operative position, the engaging element 30 of the lever 29 rests in the vertical section 34b of the groove 34 in the guide plate 33 and, as a consequence, the first contact 3 is closed. However, the contact pieces 17 and 18 of the by-pass switch units 5, 6 are left open. Under this condition, the first power source is connected to the load circuit via the switch unit 2. When an attempt is made to turn the interlock plate 41 clockwise in the illustration under this condition to close the by-pass switch unit 6 for the second power unit, movement of the first interlocking element 43 is hindered due to abutment against the engaging element 30 and, as a consequence, the by-pass switch unit 6 cannot be closed. Thus, concurrent connection of the two power sources to the load circuit can be fairly avoided. Since the interlock plate 41 is allowed to turn counterclockwise, the by-pass switch unit 5 for the first power source can be closed as shown in FIG. 10. In this case, the first power source is connected to the load circuit via the switch unit 2 and the first by-pass power unit 5.

When an attempt is made to open the first contact 3 and to close the second contact 4 of the switch unit 2 at connection of the first power source to the load circuit via the switch unit 2 and the by-pass switch unit 5, the engaging element 32 of the lever 31 is not allowed to invade into the vertical section 35b of the groove in the guide plate 33 due to abutment against the third interlocking element 45 of the interlock plate 41, so that the lever 31 is not allowed to turn and the contact 4 cannot be closed. Again concurrent connection of the two power sources to the load circuit can be effectively avoided.

Figure 13:
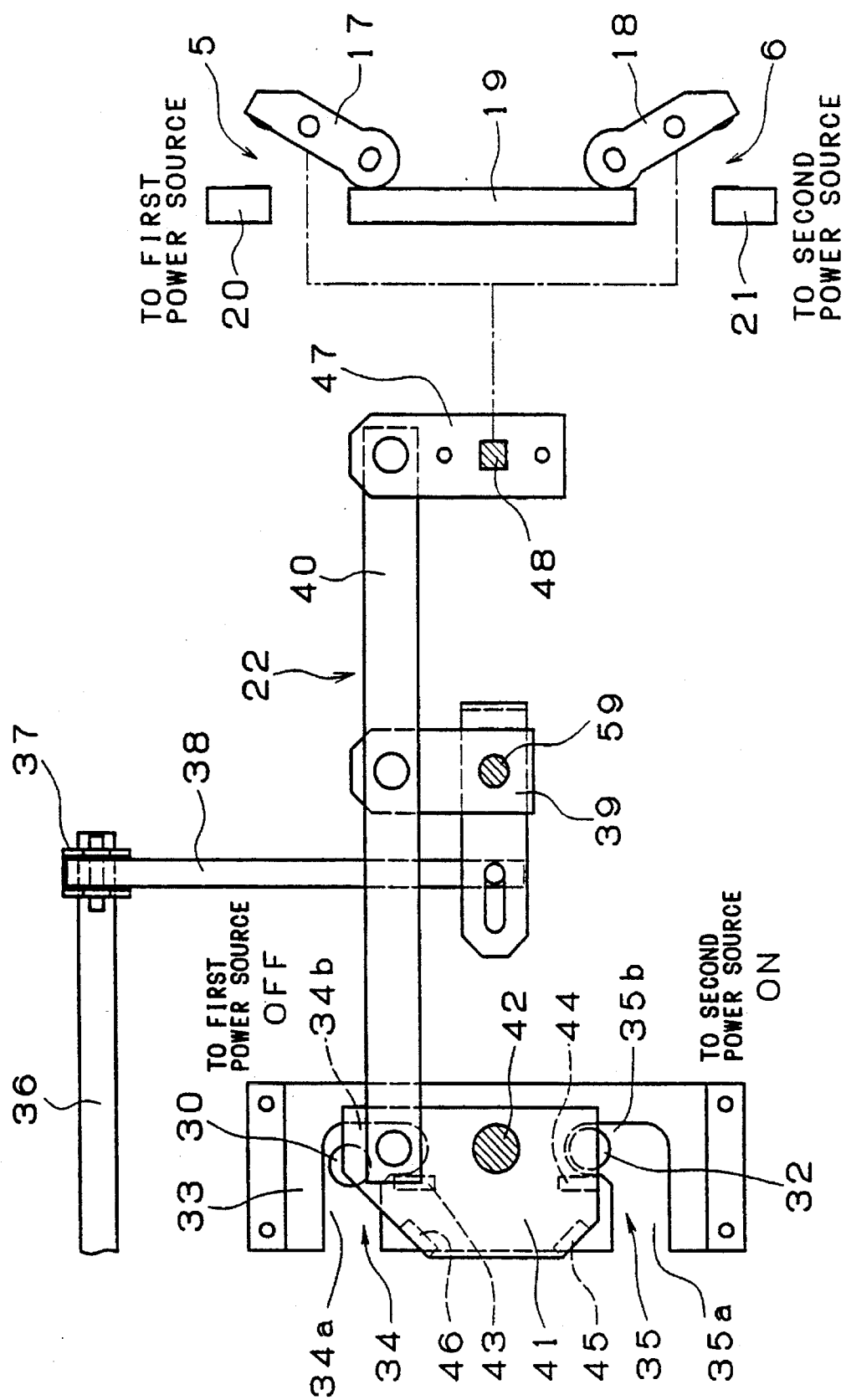
Figure 14:
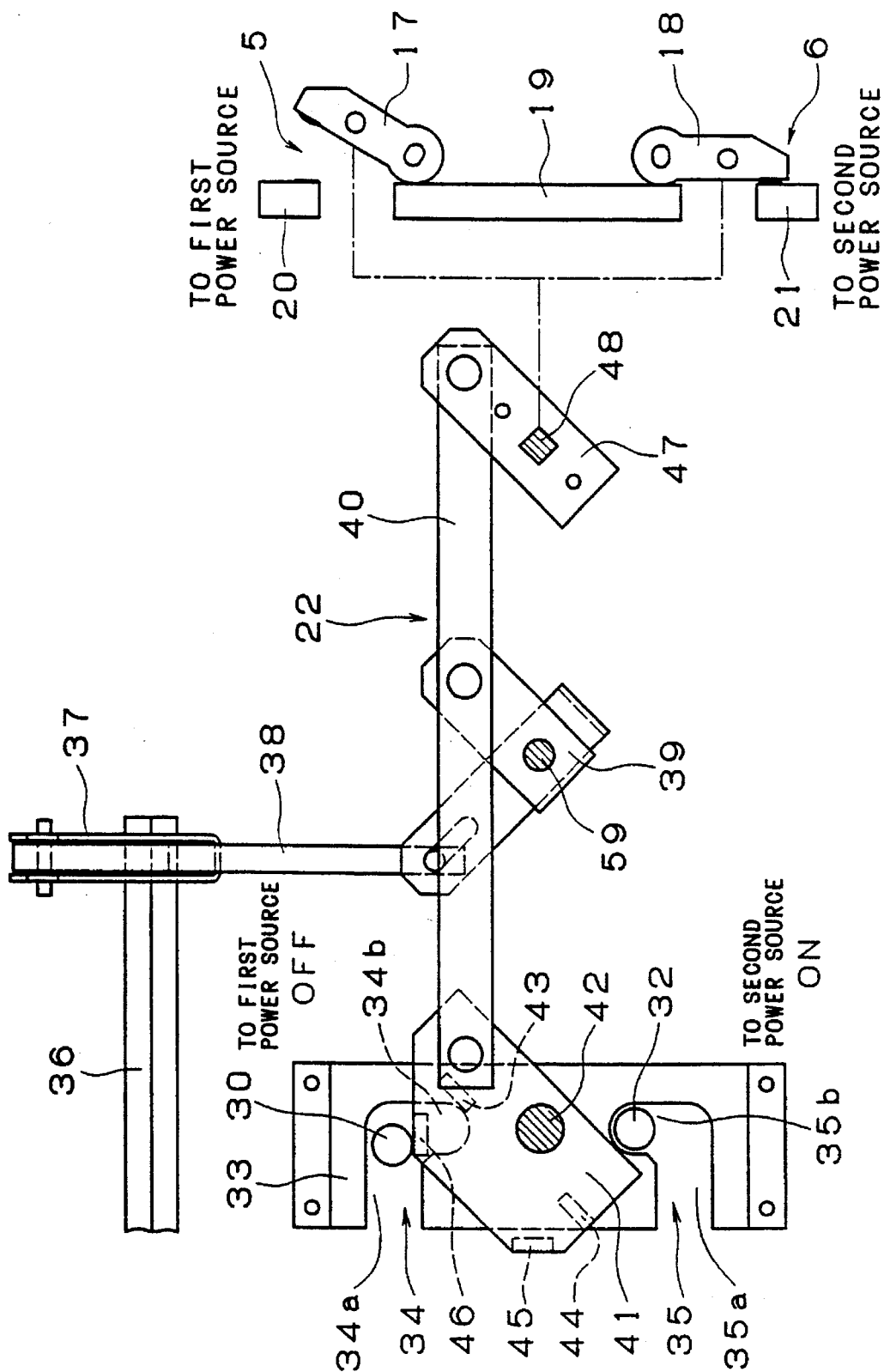

Under the condition shown in FIG. 13, the switch unit 2 is registered at the operative position, the contact 4 for the second power source is closed and the by-pass switch units 5 and 6 are both left open. Under this condition, the second power source is connected to the load circuit. When an attempt is made to turn the interlock plate 41 counterclockwise, its interlocking element 44 abuts against the engaging element 32 of the lever to hinder the turning and, as a consequence, the by-pass switch unit 5 for the first power source cannot be closed. The interlock plate 41 can, however, turn clockwise to allow closure of the by-pass switch unit 6 for the second power source as shown in FIG. 14. In this case, the second power source is connected to the load circuit via the switch unit 2 and the by-pass switch unit 6.

When an attempt is made to first open the second contact 4 and thereafter close the first contact 3 of the switch unit 2 after connection of the second power source to the load circuit via the switch unit 2 and the by-pass switch unit 6, as shown in FIG. 14, the engaging element 30 abuts against the fourth interlocking element 46 of the interlock plate 41 to inhibit turning of the lever 29 and the contact 3 so that the first power source cannot be closed. Thus, concurrent connection of the two power sources to the load circuit is effectively avoided.

Operations of the first and second contacts 3, 4 of the switch unit 2 will now be explained. Since the switch unit 2 is registered at the operative position, the lock pin 54 is in engagement with the through hole 51 in the lock plate 52 and the by-pass switch units 5 and 6 are both left open. Consequently the contacts of the limit switches LS2 to LS4 are all closed. Thus, a closure command of the first or second contact 3 or 4 is transmitted to a closure control circuit and the first or second contact 3 or 4 is magnetically closed. In this case, interruption of power supplied to the load circuit is avoided. When the switch unit 2 is registered at the neutral position, either of the by-pass switch units 5, 6 is closed for continued connection of one power source to the load circuit.

As shown in FIGS. 10 and 14, when the by-pass switch unit 5 or 6 is closed, the limit switch LS3 or LS4 is pushed by the operation lever 47 to open its contacts and the closure command for the contact 3 or 4 of the by-pass switch unit 5 or 6 in the open state is not passed to the closure control circuit. As a result, it is unable to open either of the contacts 3 and 4. When the by-pass switch unit 5 is closed as shown in FIG. 10, the third interlocking element 45 of the interlock plate 41 blocks the vertical section 35b of the groove in the guide plate 33 to hinder movement of the engaging element 32 related in operation to the second contact 4 and, as a consequence, the second contact 4 cannot be closed. When the by-pass switch unit 6 is closed as shown in FIG. 14, the fourth interlocking element 46 of the interlock plate 41 blocks the vertical section 34b of the groove in the guide plate 33 to hinder movement of the engaging element 30 related in operation to the first contact 3 and, as a consequence, the first contact 3 cannot be closed. Thus, concurrent connection of the first and second power sources to the load circuit is effectively avoided.

Extraction of the switch unit 2 to the inoperative position for testing and maintenance purposes will next be explained. When the first contact 3 is closed for ordinary power supply as shown in FIG. 9, the engaging element 30 rests in the vertical section 34b of the groove in the guide plate 33 and, as a consequence, the switch unit 2 cannot be taken out of the housing 10. When the second contact 4 is closed for ordinary power supply as shown in FIG. 13, the engaging element 32 rests in the vertical section 35b of the groove in the guide plate 33 and, as a consequence, the switch unit 2 again cannot be taken out of the housing 10.

In order to extract the switch unit 2 to the inoperative position, one of the by-pass switch units 5 and 6 has to be closed to assure continued power supply to the load circuit. That is, when the switch unit 2 is to be extracted to the inoperative position under a condition that the switch unit 2 is connected to the first power source and the by-pass switch units 5, 6 are both left open as shown in FIG. 9, the by-pass switch unit 5 is first closed as shown in FIG. 10 in order to maintain the supply of power to the load circuit therethrough and, thereafter, the contacts 3 and 4 of the switch unit 2 are both opened to the neutral position as shown in FIG. 10. Thus, the supply of power to the load circuit is maintained. Under this condition, the engaging elements 30 and 32 of the switch unit 2 are both located outside the vertical sections 34b, 35b of the grooves in the guide plate 33. By extracting the lock pin 54 out of the through hole 51 in the lock plate 52, the switch unit 2 can be smoothly registered at the inoperative position shown in FIG. 12.

Figure 15:
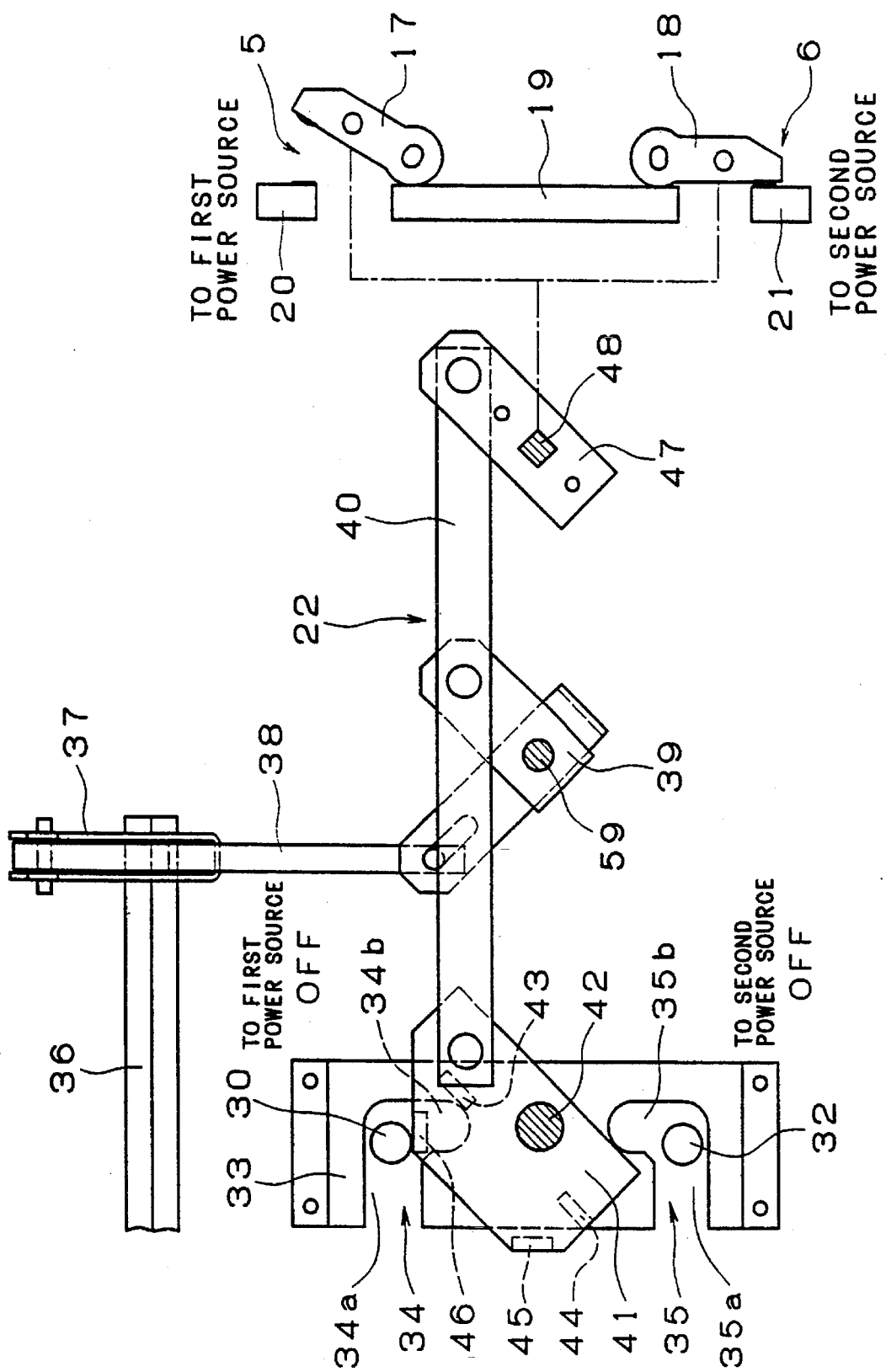

When the switch unit 2 is to be extracted to the inoperative position under a condition that the switch unit 2 is connected to the second power source and the by-pass switch units 5, 6 are both left open for ordinary power supply as shown in FIG. 13, the by-pass switch unit 6 is first closed as shown in FIG. 14 to keep power supply to the load circuit therethrough. Next, the contacts 3 and 4 of the switch unit 2 are made open to the neutral position as shown in FIG. 15.

Figure 16:
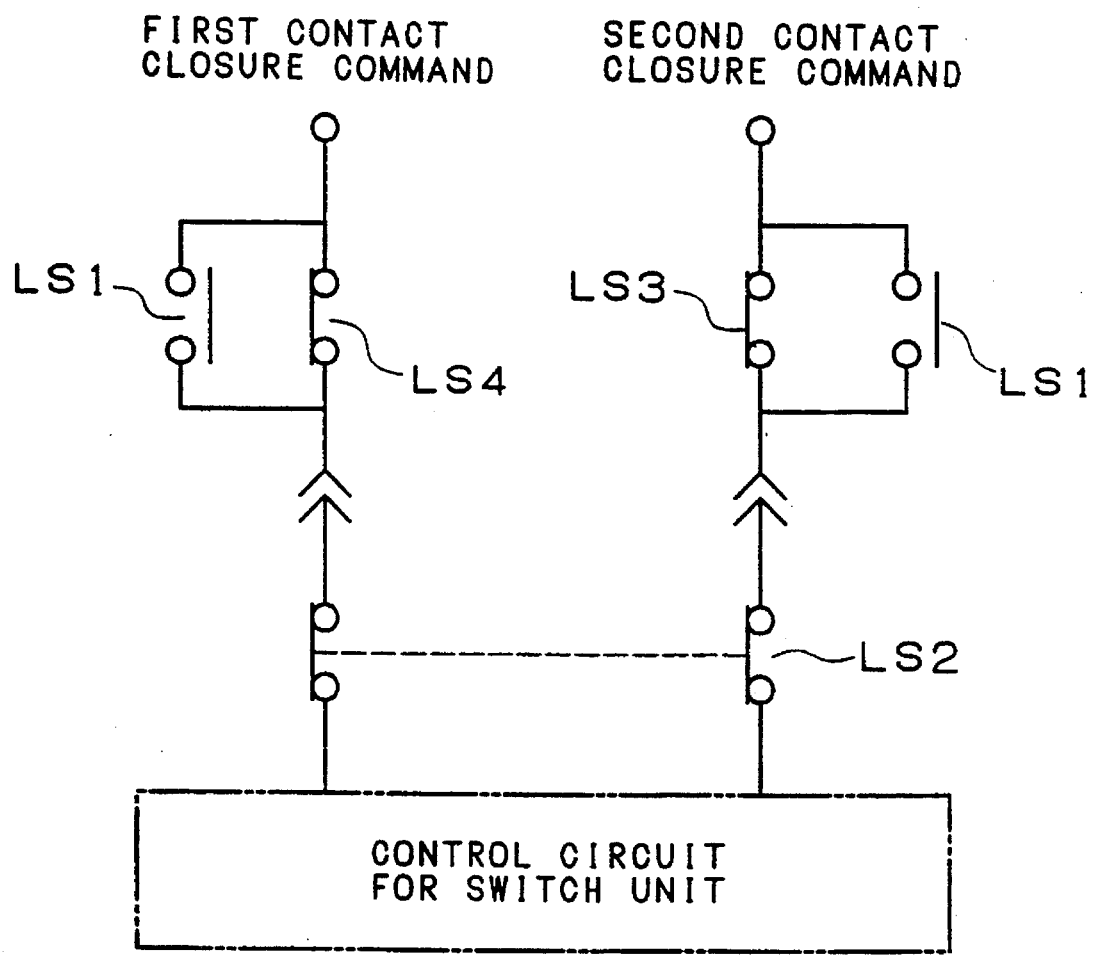
FIG. 16 is a circuit diagram of the control circuit for the switching device.

When the switch unit 2 is located between the operative and inoperative positions, the lock pin 54 is lifted and, as shown in FIG. 16, the contacts of the limit switch LS2 are left open. Thus, neither closure command for the contacts 3 and 4 are passed to the closure control circuit and, as a consequence, neither of the contacts 3 and 4 are closed. In addition, the engaging elements 30 and 32 assume positions shown by imaginary lines in contact with the lower edges of the horizontal sections 34a, 35a of the grooves in the guide plate 33, the levers 29 and 31 are not allowed to turn and the contacts 3 and 4 cannot be closed.

Figure 12:
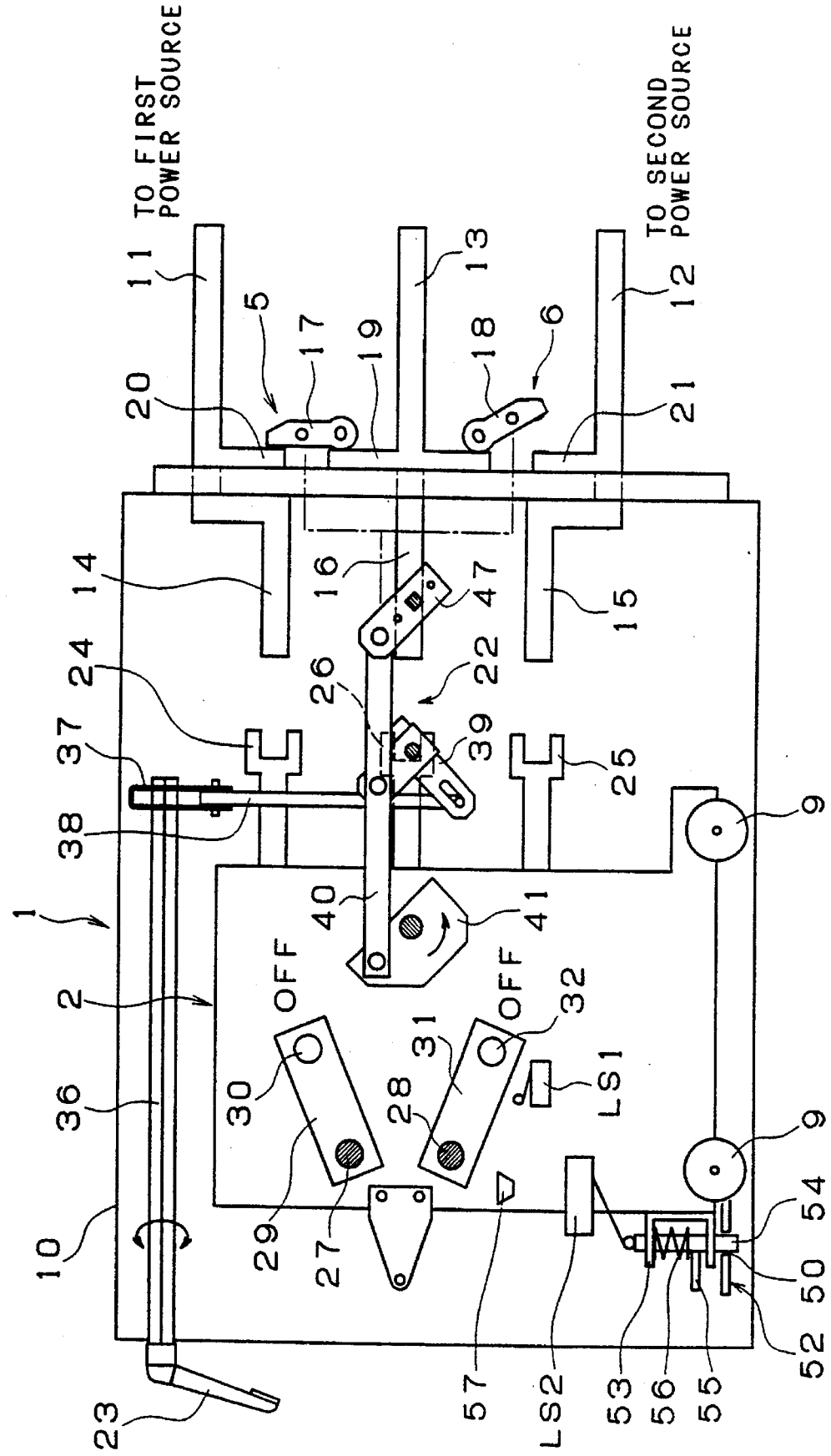

When the switch unit 2 is registered at the inoperative position in FIG. 12, the lock pin 54 is in engagement with the through hole 50 in the lock plate 52, the limit switch LS1 is out of contact with the projection 57, and the limit switches LS1 and LS2 are closed in FIG. 16. Closure commands for the contacts 3 and 4 are passed to the closure control circuit to close their contacts for testing and maintenance purposes. When power supply from the first power source is interrupted while the switch unit 2 is at the inoperative position, the operation handle 23 is turned to close the by-pass switch unit 6 for continued power supply. A shift between the two by-pass switch units 5 and 6 can be performed quite freely.

When the switch unit 2 is to be shifted from the inoperative position to the operative position, the contact 3 and 4 of the switch unit 2 must be open as shown in FIG. 12. When either of the contact 3 and 4 is left closed, corresponding one of the engaging element 30 and 32 abuts against the front end 58 (see FIGS. 4 and 5) of the guide plate 33 to hinder entrance of the switch unit 2 into the housing 10.

In accordance with the present invention, the by-pass switch units 5, 6 and the switch unit 2 are interlocked to each other to effectively avoid concurrent connection of the two power sources to a single load circuit. Under the condition that the switch unit 2 is extracted out of the housing 10 for testing and maintenance purposes, connection between the power sources and the load circuit can be shifted quite freely.

We claim:

1. An improved power source switching device comprising:

a housing internally provided with a first contact piece for connection to a first power source, a second contact piece for connection to a second power source and a third contact piece for connection to a load circuit, a switch unit movably arranged in said housing and provided with first and second input pieces connectable to said first and second contact pieces respectively, an output piece connectable to said third contact piece, a first contact for selectively electrically connecting said first input piece to said output piece and electrically connected therebetween, and a second contact for electrically connecting said second input piece to said output piece and electrically connected therebetween in an arrangement such that, when said switch unit is registered at an operative position in said housing, said first input piece, said second input piece and said output piece are brought into contact with said first, second and third contact pieces respectively, and that, when said switch unit is registered at an inoperative position out of said housing, said first input piece, second input and said output piece are brought out of contact with said first, second and third contact pieces respectively, a first by-pass switch unit interposed electrically between said first and third contact pieces for selectively electrically connecting the first and third contact pieces, a second by-pass switch unit interposed electrically between said second and third contact pieces for selectively electrically connecting the second and third contact pieces, a first interlocking element operatively related to said first and second by-pass switch units such that said first interlocking element moves when said first and second by-pass switch units are actuated, a first engaging element operatively related to said first contact such that actuation of said first contact requires movement of said first engaging element, said first engaging element being arranged so as to block movement of said first interlocking element when said first contact is closed in order to inhibit closure of said second by-pass unit, a second interlocking element operatively related to said first and second by-pass switch units such that said second interlocking element moves when said first and second by-pass switch units are actuated, a second engaging element operatively related to said second contact such that actuation of said second contact requires movement of said second engaging element, said second engaging element being arranged so as to block movement of said second interlocking element when said second contact is closed in order to inhibit closure of said first by-pass unit, a third interlocking element arranged so as to block movement of said second engaging element when said first by-pass switch unit is closed in order to inhibit closure of said second contact, and a fourth interlocking element arranged so as to block movement of said first engaging element when said second by-pass switch unit is closed in order to inhibit closure of said first contact.

2. The improved power source switching device as claimed in claim 1, wherein said first and second by-pass switch units are arranged within an arc-suppression chamber.

3. The improved power source switching device as claimed in claim 1, wherein said first and second engaging elements are arranged on a transmission mechanism for driving said first and second by-pass switch units;

said transmission mechanism is interposed between said housing and one side face of said switch unit; and said first and second engaging elements are arranged next to said one side face of said switch unit.

4. An improved power source switching device comprising:

a housing and a switch unit movably arranged in said housing;

first, second and third contact pieces fixed to said housing, said first contact piece being adapted for connection to a first power source, said second contact piece being adapted for connection to a second power source, and said third contact piece being adapted for connection to a load circuit, a first input piece, a second input piece, and an output piece arranged on said switch unit, said first input piece being connectable to said first contact piece, said second input piece being connectable to said second contact piece, and said output piece being connectable to said third contact piece depending on a position of said switch unit in said housing, said first input piece, said second input piece and said output piece being in contact with said first, second and third contact pieces when said switch unit is at an operative position, first and second contacts arranged on said switch unit, said first contact being arranged so as to selectively electrically connect said first input piece to said output piece, said second contact being arranged so as to selectively electrically connect said second input piece to said output piece, and first and second by-pass switch units arranged on said housing, said first by-pass switch unit being arranged so as to selectively electrically connect said first contact piece to said third contact piece, said second by-pass switch unit being arranged so as to selectively electrically connect said second contact piece to said third contact piece, a first interlocking element arranged on an interlock plate on said housing for movement with actuation of said first and second by-pass switch units, a first engaging element arranged on said switch unit for movement with actuation of said first contact, said first engaging element being arranged so as to block movement of said first interlocking element when said first contact is closed, thereby inhibiting closure of said second by-pass switch unit, a second interlocking element arranged on said housing for movement with actuation of said first and second by-pass switch units, a second engaging element arranged on said switch unit for movement with actuation of said second contact, said second engaging element being arranged so as to block movement of said second interlocking element when said second contact is closed, thereby inhibiting closure of said first by-pass switch unit, a third interlocking element arranged on said housing for movement with actuation of said first and second by-pass switch units, said third interlocking element being arranged so as to block movement of said second engaging element when said first by-pass switch unit is closed, thereby inhibiting closure of said second contact, and a fourth interlocking element arranged on said housing for movement with actuation of said first and second by-pass switch units, said fourth interlocking element being arranged so as to block movement of said first engaging element when said second by-pass switch unit is closed, thereby inhibiting closure of said first contact.

5. The improved power source switching device as claimed in claim 4, wherein:

said first and second by-pass switch units are arranged within an arc-suppression chamber.

6. The improved power source switching device as claimed in claim 4, wherein:

said first and second engaging elements are arranged on a transmission mechanism for driving said first and second by-pass switch units;

said transmission mechanism is interposed between said housing and one side face of said switch unit; and said first and second engaging elements are arranged next to said one side face of said switch unit.

* * * * *